United States Patent [19]

Aine et al.

[11] Patent Number: 4,585,209

[45] Date of Patent: Apr. 29, 1986

[54] MINIATURE VALVE AND METHOD OF MAKING SAME

[75] Inventors: Harry E. Aine, 30600 Page Mill Rd.; Barry Block, 30610 Page Mill Rd., both of Los Altos, Calif. 94022

[73] Assignees: Harry E. Aine; Barry Block, both of Los Altos, Calif.

[21] Appl. No.: 545,907

[22] Filed: Oct. 27, 1983

[51] Int. Cl.[4] .............................................. F16K 31/02
[52] U.S. Cl. ................................ 251/129.02; 251/298; 137/855
[58] Field of Search ............... 251/129, 141, 298, 131, 251/138; 137/855; 331/36 R; 324/61 R

[56] References Cited

U.S. PATENT DOCUMENTS

| | | | |
|---|---|---|---|
| 155,667 | 10/1874 | Painter | 137/855 |
| 1,438,974 | 12/1922 | Wente | 350/487 X |
| 2,230,537 | 2/1941 | Heuschmann | 324/61 R |
| 2,269,374 | 1/1942 | Kühnemann | 324/61 R |
| 2,901,623 | 8/1959 | Wouters | 251/141 X |
| 3,295,042 | 12/1966 | Evalds et al. | 324/61 R X |
| 3,544,201 | 1/1968 | Fowler et al. | 350/487 |
| 3,736,647 | 6/1973 | Roeder et al. | 324/61 R X |
| 4,142,144 | 2/1979 | Rohr | 324/61 R |

*Primary Examiner*—Larry Jones
*Attorney, Agent, or Firm*—Harry E. Aine

[57] ABSTRACT

In a miniature valve, a valve seat is formed by aperturing a plate. A cantilever leaf spring is disposed overlying the apertured plate for controlling the flow of fluid therethrough. An electrostatic potential applied between the cantilever leaf spring and the valve plate pulls the leaf spring over the apertured plate for variably controlling flow through the valve in accordance with the magnitude of the applied potential. In a preferred embodiment, the cantilever leaf springs are made in batch form by etching a silicon wafer. A flow controller is provided by measuring the electrical capacitance of the valve, comparing it with a reference voltage and deriving a feedback voltage applied to the valve for controlling flow therethrough. In one embodiment, the width of the cantilever leaf spring valve member is narrowed toward its free end for finer control of flow.

17 Claims, 7 Drawing Figures

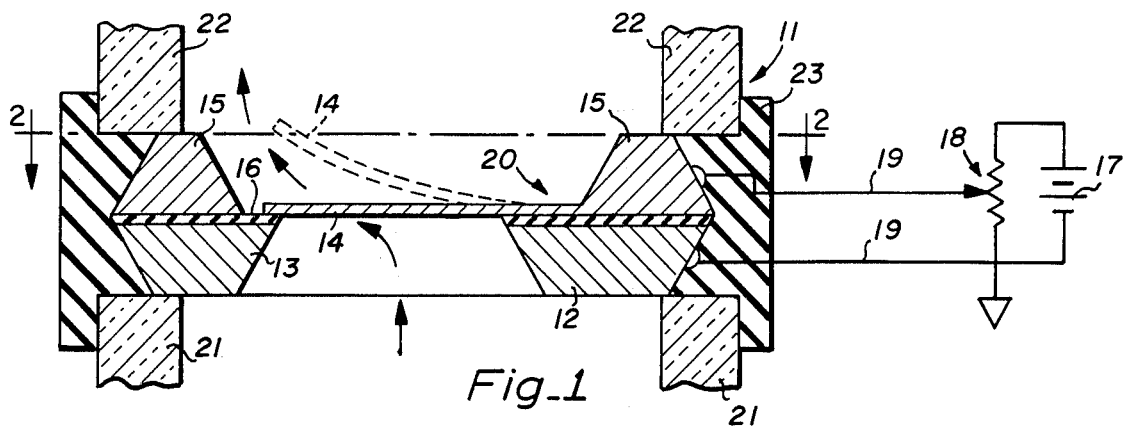
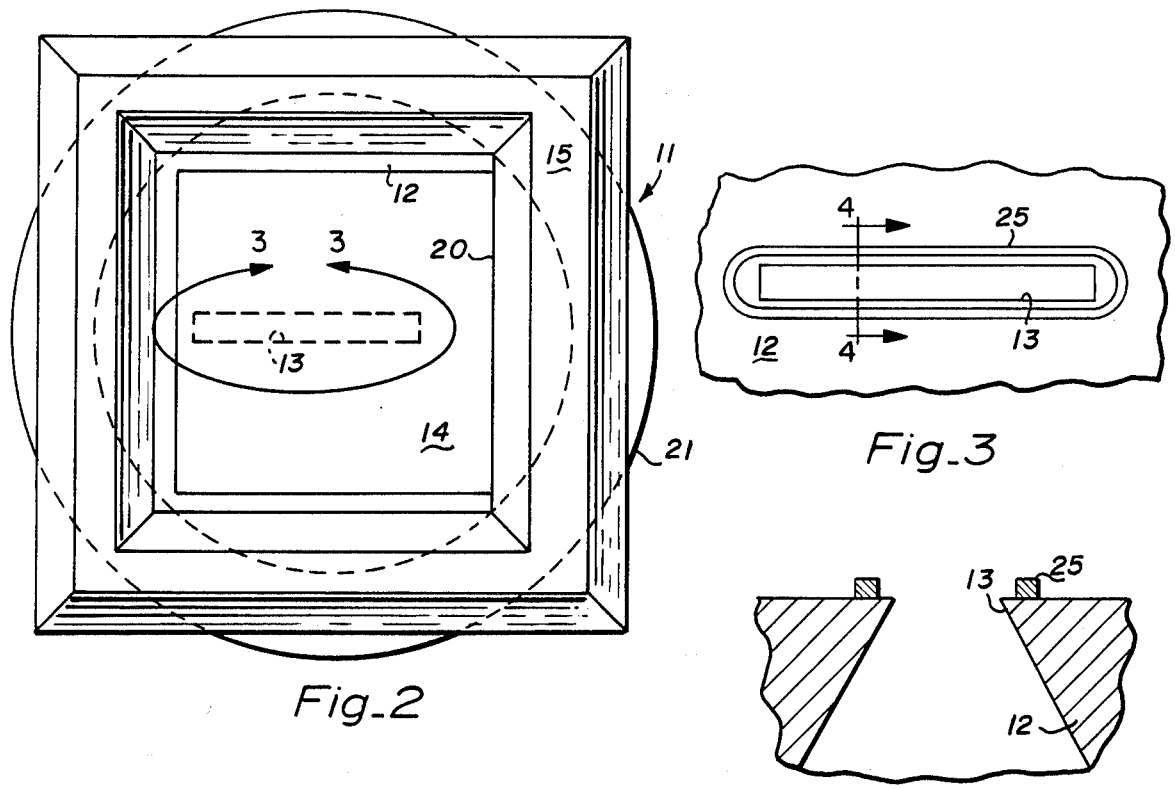
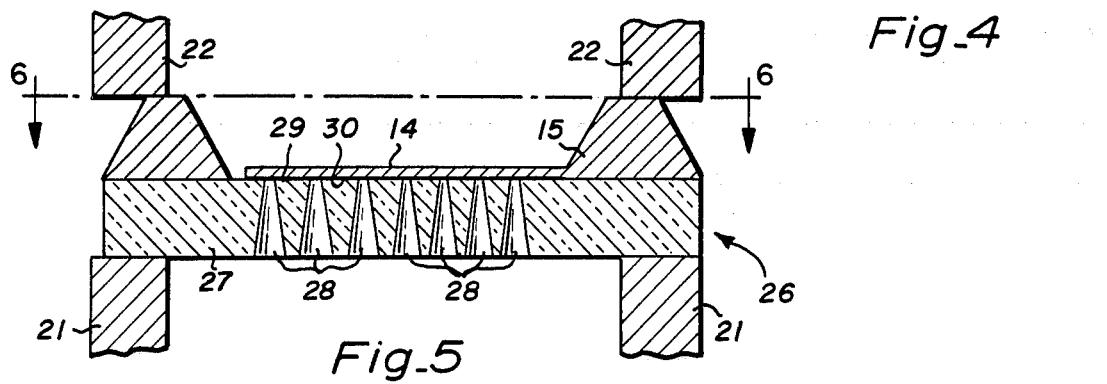

MINIATURE VALVE AND METHOD OF MAKING SAME

BACKGROUND OF THE INVENTION

The present invention relates in general to miniature flow control valves and, more particularly, to an improved miniature valve which is variably controlled or closed via the application of an electrostatic potential between the valve seat and the valve member. In addition, the valve structure is readily fabricated by batch semiconductor processing technology.

DESCRIPTION OF THE PRIOR ART

Heretofore, miniature variable control valves have typically employed a valve seat with a ball valve member movable into and out of sealing engagement with the seat by means of a solenoid or heat applied to a thermal expansion member controlling the position of the ball valve member.

One of the problems with such an arrangement is that it is relatively bulky and requires that a substantial number of individual parts be fabricated and assembled to form the valve.

It would be desirable to provide a miniature variable control valve which has a minimum of parts and which is amenable to batch fabrication type processes typically used in the semiconductive industry.

SUMMARY OF THE PRESENT INVENTION

The principal object of the present invention is the provision of an improved miniature flow control valve and method of making same.

In one feature of the present invention, a cantilever leaf spring overlies an apertured valve plate through which the flow of fluid is to be controlled and an electrical potential is applied between the valve plate and the cantilever leaf spring valve member for pulling the valve member by electrostatic attraction over said apertured plate in at least partially closing relation therewith for controlling the flow through the apertured plate.

In another feature of the present invention, the apertured region in the valve plate is elongated with the axis of elongation extending away from the root portion of the cantilever spring toward the free end portion thereof for facilitating variable control of the flow through the apertured plate.

In another feature of the present invention, a sealing ridge extends around the lip portion of the aperture in the apertured plate to facilitate sealing of the valve member to the valve seat.

In another feature of the present invention, the cantilever leaf spring valve member is formed by etching a semiconductive wafer in such a manner as to leave the cantilever leaf spring supported from a support structure.

In another feature of the present invention, the area of the valve leaf spring structure which overlies the valve seat structure is at least three times the cross-section area of the apertured portion of the valve plate, whereby relatively lower voltages may be applied between the members for controlling the flow through the valve.

In another feature of the present invention, the cantilever leaf spring valve member is electrically insulated from the valve plate via the intermediary of a layer of silicon dioxide grown on one of the members.

Other features and advantages of the present invention will become apparent upon a purusal of the following specification taken in connection with the accompanying drawings wherein:

BRIEF DESCRIPTION OF THE DRAWINGS

FIG. 1 is a longitudinal cross-sectional view of a miniature flow control valve incorporating features of the present invention, FIG. 2 is a cross-sectional view of the structure of FIG. 1 taken along line 2—2 in the direction of the arrows, FIG. 3 is an enlarged detail view of an alternative to the valve plate structure of FIG. 2 delineated by line 3—3, FIG. 4 is an enlarged sectional view of the structure of FIG. 3 taken along line 4—4 in the direction of the arrows, FIG. 5 is a view similar to that of FIG. 1 depicting an alternative embodiment of the present invention.

DESCRIPTION OF THE PREFERRED EMBODIMENTS

Figure 6:
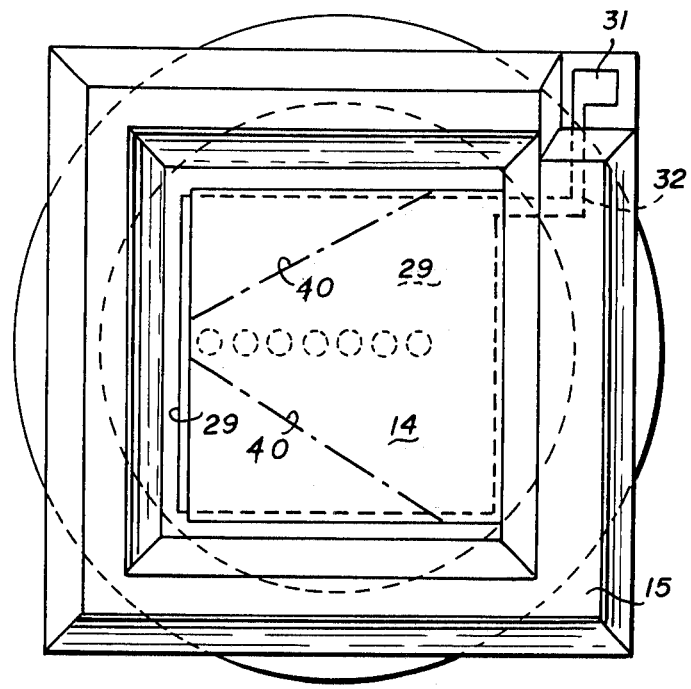
FIG. 6 is a cross-sectional view of the structure of FIG. 5 taken along 6—6 in the direction of the arrows.

Referring now to FIGS. 1 and 2, there is shown a miniature flow control valve 11 incorporating features of the present invention. The valve 11 includes a valve plate structure 12 having an aperture 13 formed therein through which the flow of fluid is to be controlled. A cantilever leaf spring valve member 14 is disposed overlaying the aperture 13 in the valve plate 12. The leaf spring 14 is joined at its root portion 20 to a surrounding support or frame structure 15.

An electrically insulative layer 16 is provided between the frame 15, cantilever leaf spring 14, and the valve plate 12 for electrically isolating the valve member 14 from the valve seat region of the valve plate 12. An electrical potential, supplied from a battery 17 or other source, is applied between the valve member 14 and the valve plate 12 via the intermediary of the potentiometer 18 and leads 19 making electrical connection to the frame 15 and valve plate 12, respectively.

Sections of aligned gas flow tubing 21 and 22 are fixedly secured to the adjoining faces of the valve plate 12 and frame 15, respectively. In a typical example, the aligned sections of tubing 21 and 22 are fixed to the respective members 12 and 15 via the intermediary of a suitable adhesive as of epoxy. After the frame 15 and valve plate 12 have been held together and joined to the adjoining sections of flow tubing 21 and 22, the assembly is potted with a suitable potting material 23 such as a relatively rigid electrically insulative plastic material.

In operation, fluid tubing 21 is connected to a source of fluid under pressure, the flow of which is to be controlled via the valve 11. The potentiometer 18, for full flow conditions, is adjusted for zero potential difference between the cantilever leaf spring valve member 14 and the valve seat region underlying the cantilever spring 14. The fluid pressure exerted on the cantilever leaf spring causes the leaf spring to be deflected as indicated by the dotted lines of FIG. 1. This, then, represents the full flow position of the control valve 11.

The flow is then adjusted to a desired limited value by adjusting the setting of the potentiometer 18. As the potential applied to the valve 11 is increased, electrostatic attractive forces between the valve seat region and the valve member 14 cause an increasing proportion of the flow aperture 13 to be closed off. The closing action begins proximate the root end of the cantilever spring valve member 14 and progresses with increasing potential toward the free end of the cantilever spring 14.

The insulative material 16 and its thickness are chosen such that the required electrostatic force is obtained for closure of the valve without exceeding the dielectic strength of the insulative layer 16. Also, the thickness of the cantilever spring 14 is chosen such that in the absence of an applied potential, the desired flow rate is obtained through the opening 13. With relatively thin layers of good dielectric strength insulative material 16, such as silicon dioxide and silicon nitride in thicknesses from 1,000 Å to 10,000 Å, relatively low operating voltages may be employed in the range of five to 100 volts. In a typical example, the valve 11 is dimensioned to fit inside a standard ¼" o.d. tubing 21 and 22.

The flow control valve 11 is conveniently fabricated in batch form by chemically etching a silicon wafer. More particularly, the frame 15 and valve member 14 are conveniently formed by anisotropically etching a silicon wafer from one major face and terminating the etch on an etch stop layer deposited on the other major face of the wafer to a thickness corresponding to the desired thickness of the cantilever spring valve member 14. In a typical example, the etch stop layer may comprise a layer of n-type conductivity silicon material on a P-type substrate to provide an electro-etch stop with a passivating potential of plus 0.5 volts applied to the n layer relative to the etchant electrolyte (KOH). This is disclosed in U.S. Pat. No. 3,689,389 issued Sept. 5, 1972. As an alternative, the etch stop layer may be doped to a suitable dopant concentration of P material such as greater than $5 \times 10^{19}$ per cubic centimeter and used as a concentration stop with a suitable etchant such as ethylene diamine, pyrocatechol (E.D.P.). In still another alternative, the etch stop layer may be silicon dioxide grown on the substrate wafer and rendered conductive for the purposes of electrostatic attraction by means of an electrically conductive layer deposited on the face thereof facing the valve seat. A suitable, electrically conductive material would be gold deposited to a thickness of 5,000 Å over 500 Å of TiW. Silicon dioxide is a good etch stop layer for the anisotropic etchant E.D.P.

The silicon valve plate 12 is conveniently apertured (perforated) by anyone of the aforecited anisotropic etchants for etching silicon. The mutually opposed faces of the wafers which are to form the valve seat and cantilever valve member 14, are polished surfaces of silicon wafers as of mirror finish.

Referring now to FIGS. 3 and 4, there is shown an alternative embodiment of the present invention wherein a sealing ridge 25, as of 1 to 5 microns in height and 2 to 3 mils in width, is formed encircling the flow aperture 13. This ridge is conveniently formed by masking and etching the major face of the wafer to leave the ridge portion 25. The sealing ridge 25 facilitates the formation of a gas-tight seal by being pressed into firm sealing engagement with the leaf spring member 14 by the pull of electrostatic attraction between the leaf spring 14 and the underlying valve seat region of the valve plate 12.

Referring now to FIGS. 5 and 6, there is shown an alternative embodiment of the present invention. More particularly, the miniature flow control valve assembly 26 includes an apertured valve plate 27 of an electrically insulative material, such as glass sold under the trademark "PYREX" commercially available from Corning Glass as 7740 glass. Pyrex glass plate 27 is suitably apertured with a linear array of circular openings 28 formed by laser drilling. As an alternative, the Pyrex glass plate may be etched with a suitable HF etchant to provide a rectangular opening similar to that of 13 in the embodiment of FIGS. 1 and 2.

The valve seat surface of the major face of the valve plate 27 is coated with a suitable electrically conductive material as of gold to a thickness of 5,000 Å deposited over 500 Å of Cr. The conductive layer is then patterned to provide a valve seat electrode 29 which is to underlie the cantilever valve spring 14. The electrode 29 is connected to contact pad 31 via a lead portion 32 of the metallization layer forming the electrode 29.

The cantilever leaf spring valve member 14 and surrounding frame portion 15 are essentially identical to that previously described with regard to FIGS. 1 and 2. However, an insulative layer 30 is deposited on the face of the cantilever leaf spring portion 14 which faces the valve plate 27. This serves to electrically insulate the cantilever leaf spring valve member 14 from the valve seat electrode 29. The electrically insulative layer formed on the valve member 14 is conveniently formed by growing a silicon dioxide layer on the major face of the silicon wafer which is to form the frame and valve member and then selectively patterning the oxide by a suitable oxide etchant such as buffered HF. The pattern removes the oxide from the regions of the wafer other than those of the valve member 14. Again, the mutually opposed faces of the silicon wafer and Pyrex glass plate 27 are polished surfaces and the silicon wafer is bonded overlaying the glass wafer 27 by anodic bonding.

The silicon frame member 15 includes a notched portion overlaying the contact pad 31 to provide access to the underlying pad 31. After the glass and silicon wafers have been bonded together, the individual valves 26 may be tested while the assembly is still in wafer form. Thereafter, the composite wafer is diced into individual valve assemblies 26 by conventional sawing techniques employing a saw tape extending over the opposite major faces of the composite bonded assembly so as not to introduce contaminants into the valve mechanisms. Thereafter the bonded valve assemblies are positioned between the flow tube segments 21 and 22 and potted in place as previously described with regard to FIGS. 1 and 2.

The advantage to the miniature flow control valve of the present invention is that it is amenable to batch fabrication utilizing silicon semiconductor processing technology, thereby reducing its cost of manufacture. In addition, it allows, the valve size to be reduced to a minimum and permits a relatively low voltage to be employed for variably controlling the flow through the valve. Since the operation of the valve is electrostatic, it consumes essentially no power.

In an alternative embodiment of the cantilever leaf spring valve, as shown by phantom lines 40 of FIG. 6, the width of the cantilever leaf spring 14 is narrowed toward the free end of the cantilever leaf spring. This will decrease the strength of the spring bias near the free end of the spring. Thus, it will require additional electrical potential to achieve the same degree of closure of the valve. As a result, a finer control is obtained over the low flow regime of the valve than that obtained by the rectangular valve 14.

As thus far described, the miniature control valve has used an electrostatic potential for controlling the amount of closure of the valve. This is not a requirement. The miniature valve may be used without the applied potential and thus, without the insulator 16, relying on the spring constant of the leaf spring 14 for providing a restoring force or closure force on the valve. In this configuration, the valve would operate as a check valve allowing flow in only one direction. Reverse flow would produce closure of the valve.

Figure 7:
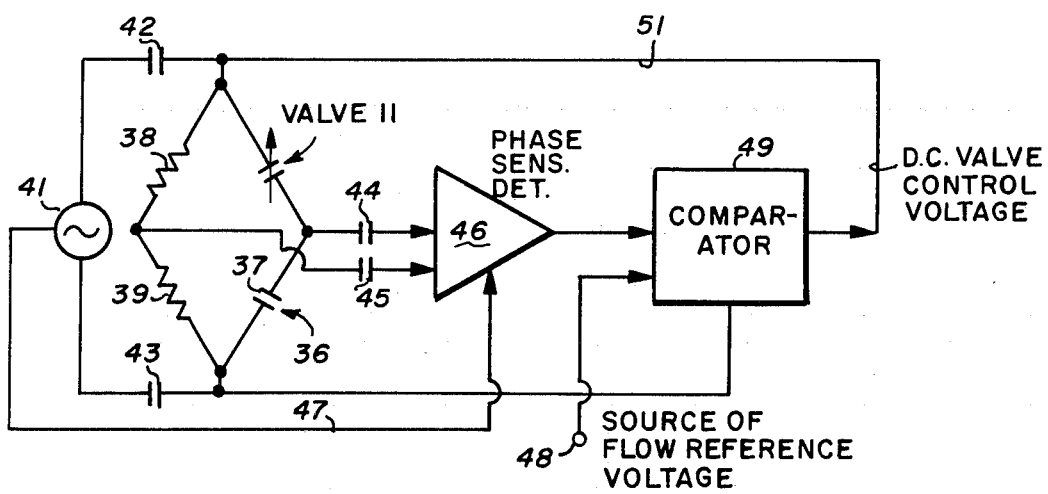
FIG. 7 is a schematic circuit diagram, partly in block diagram form, of a fluid flow controller incorporating features of the present invention.

Referring now to FIG. 7 there is shown a fluid flow controller 35 incorporating features of the present invention. The capacitance of the valve 11 is connected in one arm of a bridge circuit 36 including a reference capacitor 37 and a pair of resistors 38 and 39. The bridge circuit 36 is excited with a radio frequency voltage, at say 10 KHz, from an oscillator 41 feeding opposite terminals of the bridge 36 through the intermediary of d.c. isolating capacitors 42 and 43. Reference capacitor 37 has a value of capacitance equal to the capacitance of the valve 11 at its fully open position. Resistors 38 and 39 have a value of resistance such as to balance the reactive impedance of the valve capacitance and reference capacitance 37 such that the bridge 36 is balanced at the selected valve fully open position.

The output from the bridge is coupled via coupling (d.c. isolating) capacitors 44 and 45 into one input of a phase sensitive detector 46. Phase sensitive detector 46 phase detects the bridge unbalance signal against a reference voltage derived from the R.F. oscillator 41 over line 47. The output of the phase sensitive detector 46 is a d.c. voltage corresponding to the degree to which the valve is closed.

A calibrated source of flow reference voltage applied at terminal 48 is compared in a comparator 49 with the measured capacity voltage derived from the bridge via phase sensitive detector 46. The output of the comparator 49 is a voltage of a magnitude necessary to bring the measured position of the valve 11 into coincidence with the desired or reference position of the valve 11 as determined by the flow reference voltage at terminal 48.

The d.c. output voltage of the comparator 40 is feedback via line 51 to the valve 11 so as to cause the valve to close in proportion to the reference voltage 38. Knowing the fluid pressure head supplied to the valve 11, the flow reference voltage may be calibrated in terms of desired flow rate. In this manner, setting of the flow reference voltage will cause the valve 11 to close to such a position as to yield the desired flow rate.

What is claimed is:

1. In an electrostatic miniature valve;
   valve seat means having an opening therein through which the flow of fluid is to be controlled and having a valve seat electrode portion for receiving an operating potential in use;
   valve means for disposition adjacent said valve seat means and having a cantilever leaf spring portion for overlaying said valve seat means and said opening and also including a valve member electrode portion mechanically operatively associated with said leaf spring portion for receiving an operating potential in use; and
   electrical insulator means for disposition between said electrode portion of said valve seat means and said valve member electrode portion of said valve means, the mutually opposed areas of said electrode portions and their spacings being dimensioned for allowing an electrical potential difference to be applied between said valve means and said valve seat means for pulling said cantilever leaf spring portion by electrostatic attraction over said opening in at least partially closing relation therewith for controlling the flow of fluid therethrough.

2. The apparatus of claim 1 wherein said opening in said valve seat means is of an elongated cross-section.

3. The apparatus of claim 2 wherein said cantilever leaf spring portion of said valve means includes a free end portion for disposition proximate a first end of said elongated opening and a root portion for being fixedly secured relative to said valve seat means and for disposition proximate the second end of said elongated opening.

4. The apparatus of claim 3 including means for applying and for varying an electrical potential applied between said valve means and said valve seat means for variably controlling the flow of fluid through said opening in said valve seat means.

5. The apparatus of claim 3 wherein said cantilever leaf spring portion narrows in width toward the free end portion thereof.

6. The apparatus of claim 1 wherein said cantilever leaf spring portion of said valve is a leaf spring having a major face thereof facing said valve seat means.

7. The apparatus of claim 6 wherein said major face of said leaf spring facing said valve seat means has an area overlaying said valve seat means which is at least three times the cross-sectional area of said opening of said valve seat facing said leaf spring.

8. The apparatus of claim 7 including a sealing ridge disposed on the face of said valve seat means facing said leaf spring and encircling said opening in said valve seat means, said sealing ridge being disposed proximate said opening.

9. The apparatus of claim 1 wherein said leaf spring is made of silicon.

10. The apparatus of claim 1 wherein said insulator means is made of silicon dioxide.

11. The apparatus of claim 1 wherein said valve seat means includes an electrically conductive layer disposed on an electrically insulative plate.

12. The apparatus of claim 1 wherein said electrical insulator means includes a portion of an electrically insulative plate, said plate being apertured to define said valve seat means.

13. The apparatus of claim 1 including:
   means for measuring the capacitance of the valve between said cantilever leaf spring portion and said valve seat means to derive a positional output representative of the position of the cantilever leaf spring portion relative to said valve seat means;
   means for comparing the positional output with a reference output to derive a feedback control output voltage for application between said cantilever leaf spring portion and said valve seat means for controlling the position of the cantilever leaf spring portion of a desired position.

14. In a method for making a miniature valve, the steps of:
   etching a semiconductor wafer to define a cantilever leaf spring structure free at one end and supported from a support structure at the other end;
   perforating a plate to define a valve seat area structure encircling an aperture;

electrically insulating the cantilever leaf spring relative to said valve seat;

disposing the cantilever leaf spring overlaying said aperture and valve seat area; and applying an electrical potential between said cantilever leaf spring and said valve seat area of said plate underlying said leaf spring for electrostatically pulling said leaf spring against said valve seat area in fluid sealing engagement therewith for at least partially limiting the flow of a fluid through said aperture.

15. The method of claim 14 wherein the step of perforating the plate to define the valve seat area encircling the aperture includes the step of, etching the aperture through a semiconductive wafer.

16. The method of claim 14 wherein the step of electrically insulating the cantilever leaf spring relative to the valve seat includes the step of, growing on oxide layer on at least one of said cantilever leaf spring and valve seat structures.

17. The method of claim 14 including the steps of:
measuring the capacitance of the valve between said cantilever leaf spring and said valve seat to derive a positional output representative of the position of the cantilever spring relative to the valve seat; and comparing the positional output with a reference output to derive a feedback control output voltage for application between said cantilever leaf spring and said valve seat for controlling the position of the valve to a desired position as determined by the reference output.

* * * * *